United States Patent
Cote et al.

(10) Patent No.: US 12,523,371 B2
(45) Date of Patent: Jan. 13, 2026

(54) REUSABLE CANDLE SYSTEM

(71) Applicants: Alanah Cote, North Bay (CA); Julia Ianiro, North Bay (CA)

(72) Inventors: Alanah Cote, North Bay (CA); Julia Ianiro, North Bay (CA)

(73) Assignee: Alanah Cote, Ontario (CA)

( * ) Notice: Subject to any disclaimer, the term of this patent is extended or adjusted under 35 U.S.C. 154(b) by 384 days.

(21) Appl. No.: 18/103,588

(22) Filed: Jan. 31, 2023

(65) Prior Publication Data
US 2024/0255138 A1 Aug. 1, 2024

(51) Int. Cl.
*F23D 3/16* (2006.01)

(52) U.S. Cl.
CPC ..................... *F23D 3/16* (2013.01)

(58) Field of Classification Search
CPC .......................................... F23D 3/16
USPC ............................ 431/288–297; 17/579, 588
See application file for complete search history.

(56) References Cited

U.S. PATENT DOCUMENTS

| | | | |
|---|---|---|---|
| 4,224,017 A | 9/1980 | Kayne | |
| 6,857,869 B1 | 2/2005 | Sun | |
| 7,614,876 B1 | 11/2009 | Ward-Kubik | |
| 8,333,585 B2 | 12/2012 | Theresa et al. | |
| 9,228,737 B2 | 1/2016 | Steinmann et al. | |
| 9,341,365 B2 | 5/2016 | Gan | |
| 11,802,690 B2 * | 10/2023 | Miyagi | F23D 3/16 |
| 2006/0093979 A1 | 5/2006 | Varanasi et al. | |
| 2011/0014580 A1 | 1/2011 | Theresa et al. | |
| 2015/0086932 A1 | 3/2015 | Rutan | |
| 2017/0030574 A1 | 2/2017 | Brown | |
| 2020/0015609 A1 * | 1/2020 | Rhodes | B65D 81/38 |
| 2021/0214125 A1 | 7/2021 | Fancher | |
| 2022/0316695 A1 | 10/2022 | Pasteris et al. | |

FOREIGN PATENT DOCUMENTS

| | | | |
|---|---|---|---|
| CA | 2585223 A1 | 5/2006 | |
| CA | 3111707 A1 | 9/2022 | |
| WO | 2014210245 A1 | 12/2014 | |
| WO | WO-2021011812 A1 * | 1/2021 | |

OTHER PUBLICATIONS https://arbormade.co Sent: Oct. 29, 2022.
https://yunocandle.com Sent: Oct. 29, 2022.

* cited by examiner

*Primary Examiner* — Vivek K Shirsat
(74) *Attorney, Agent, or Firm* — Argus Intellectual Enterprise LLC; Jordan Sworen; Daniel Enea

(57) ABSTRACT

A candle system that is reusable. The reusable candle system includes a first body removably coupled to a second body in a stacked configuration to form a housing for a candle. The first body forms a channel, wherein the second body includes a closed end that supports the candle system in an upright position. A flexible sheath is positioned along an interior wall of the bodies and prevents wax waste from adhering to the candle holder. The sheath is secured to the first body and tapers towards the second body. In some embodiments, the sheath separates in to two sections, along with each body, to allow the second body to form a second candle holder. In other embodiments, the sheath is monolithic and is removable along with the first body. Once removed, the lower end of the sheath can be inverted to allow any wax waste to be removed therefrom.

20 Claims, 9 Drawing Sheets

REUSABLE CANDLE SYSTEM

BACKGROUND OF THE INVENTION

The present invention relates to reusable candles. The present invention further provides a reusable candle system comprising a two-part body that forms a candle holder when the first body is connected and the second body. A flexible sheath is disposed along an interior wall of at least one part of the body to allow for convenient removal of any remaining wax waste to allow the candle holder to be refilled and reused.

Candles have been used for centuries as a source of light and to create a pleasant ambiance. However, traditional candles have several inherent limitations and dangers. One major limitation is that they are disposable, as the wax eventually burns down and cannot be used again. This results in a significant amount of waste, as well as the need to constantly purchase new candles. Conventional candles and candle holders are typically designed for single-use and do not allow for safe and convenient reuse thereof. For example, common candle types include jar containers that contain wax that is poured directly therein from a manufacturing facility. Other types of candles include those that are designed to sit in a candle holder, wherein the bottom end of the wax candle is placed directly in a candle holder. Once a consumer is done with a candle, the consumer does not have the ability to adequately clean inside the jar for typically due to the narrow diameter and extreme depth of the jar. Additionally, the wick sustainer base is often permanently adhered to the bottom of the candle jar and can be extremely difficult to remove. These problems contribute to rendering factory-filled candles useless after the initial wax is burned, resulting in waste.

Jar candles or factory-filled candles often become unsafe and difficult to light when the wax reaches a certain level relative to the candle jar walls. The lower level of the wax and wick can cause a consumer to burn their hand when attempting to light a nearly used candle. These candle jars are not reusable because the wax adheres the container and is difficult to remove. In addition to the environmental impact of single-use candles, there are also issues with the safety and convenience of traditional candle jars. Many candle jars are made of glass, which can be easily broken and create a fire hazard. Additionally, existing candle jars are not designed for easy handling and refilling, which can be inconvenient for the consumer. Some devices exist that allow for the reuse of a candle holder; however, these devices typically provide a monolithic structure that is not separable to allow easy removal of wax waste or provide two differently sized candle holders. As a result, consumers are not receiving the complete benefit of a full-size candle, forcing candle inserts to be replaced more frequently which results in recurring waste. Therefore, there exists a need for a refillable and reusable candle system having a two-part body that forms a candle holder when the bodies are connected and allows for easy removal of any wax waste when the bodies are separated, prior to being reused. A flexible sheath is disposed along an interior wall of the body to allow for convenient removal of any remaining wax waste to allow the candle holders to be refilled and reused.

In light of the devices disclosed in the known art, it is submitted that the present invention substantially diverges in design elements and methods from the known art and consequently it is clear that there is a need in the art for an improvement for reusable candle systems. In this regard the instant invention substantially fulfills these needs.

SUMMARY OF THE INVENTION

In view of the foregoing disadvantages inherent in the known types of reusable candle systems present in the known art, the present invention provides a new reusable candle system for easily removing waste wax and refilling a candle holder.

It is an objective of the present invention to provide an embodiment of the reusable candle system comprising a first body removably coupled to a second body in a stacked configuration to form a first candle holder. The first body forms a channel having an open first and second end, wherein the second body includes a closed second end configured to support the candles system in an upright configuration. The second end of the first body is adapted to interlock with the first end of the second body. A flexible sheath lines an interior wall of the bodies and prevents wax waste from adhering to the candle holder.

It is another objective of the present invention to provide an embodiment of the reusable candle system wherein the sheath is secured to the first body and tapers towards the second body.

It is yet another objective of the present invention to provide an embodiment of the reusable candle system wherein the sheath separates in to two sections, along with each body, to allow the second body to form a second candle holder.

It is yet another objective of the present invention to provide an embodiment of the reusable candle system wherein the sheath is monolithic and is removed along with the first body. Once removed, the lower end of the sheath can be inverted to allow any wax waste to be removed therefrom.

It is another objective of the present invention to provide an embodiment of the reusable candle system that is safer to use than traditional candles. The removable and cleanable sheath of the present invention prevents wax waste from adhering to the candle holder, reducing the risk of fire and the emission of harmful chemicals to allow consumers to refill the candle system at home.

It is therefore an object of the present invention to provide a new and improved reusable candle system that has all of the advantages of the known art and none of the disadvantages.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings.

DETAILED DESCRIPTION OF THE INVENTION

Reference is made herein to the attached drawings. For the purposes of presenting a brief and clear description of the present invention, the preferred embodiment will be discussed as used for providing a reusable and refillable candle container. The figures are intended for representative purposes only and should not be considered to be limiting in any respect.

Reference will now be made in detail to the exemplary embodiment(s) of the invention. References to "one embodiment," "at least one embodiment," "an embodiment," "one example," "an example," "for example," and so on indicate that the embodiment(s) or example(s) may include a feature, structure, characteristic, property, element, or limitation but that not every embodiment or example necessarily includes that feature, structure, characteristic, property, element, or limitation. Further, repeated use of the phrase "in an embodiment" does not necessarily refer to the same embodiment.

Figure 1:
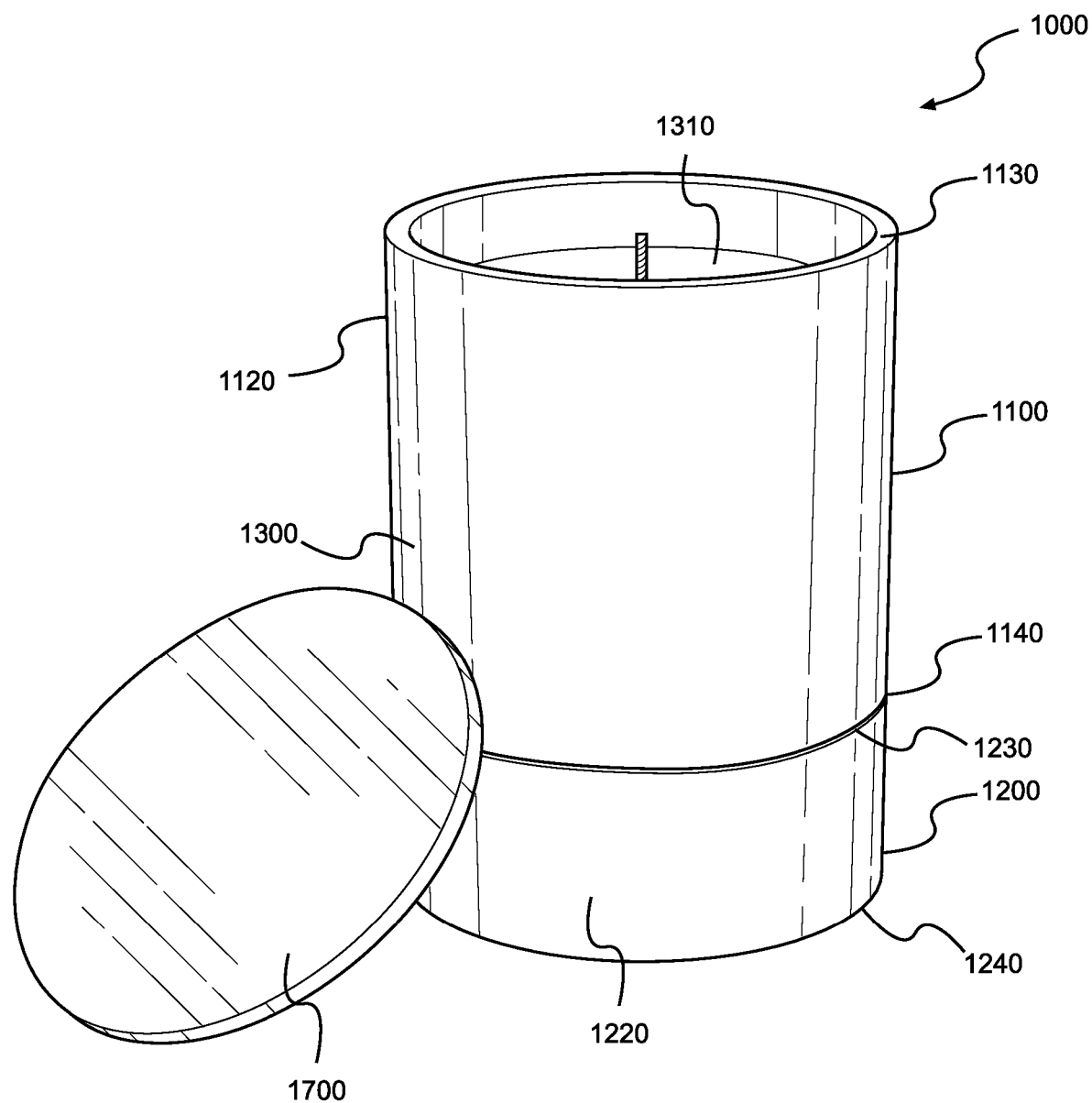
FIG. 1 shows a perspective view of an embodiment of the reusable candle system.
Figure 2:
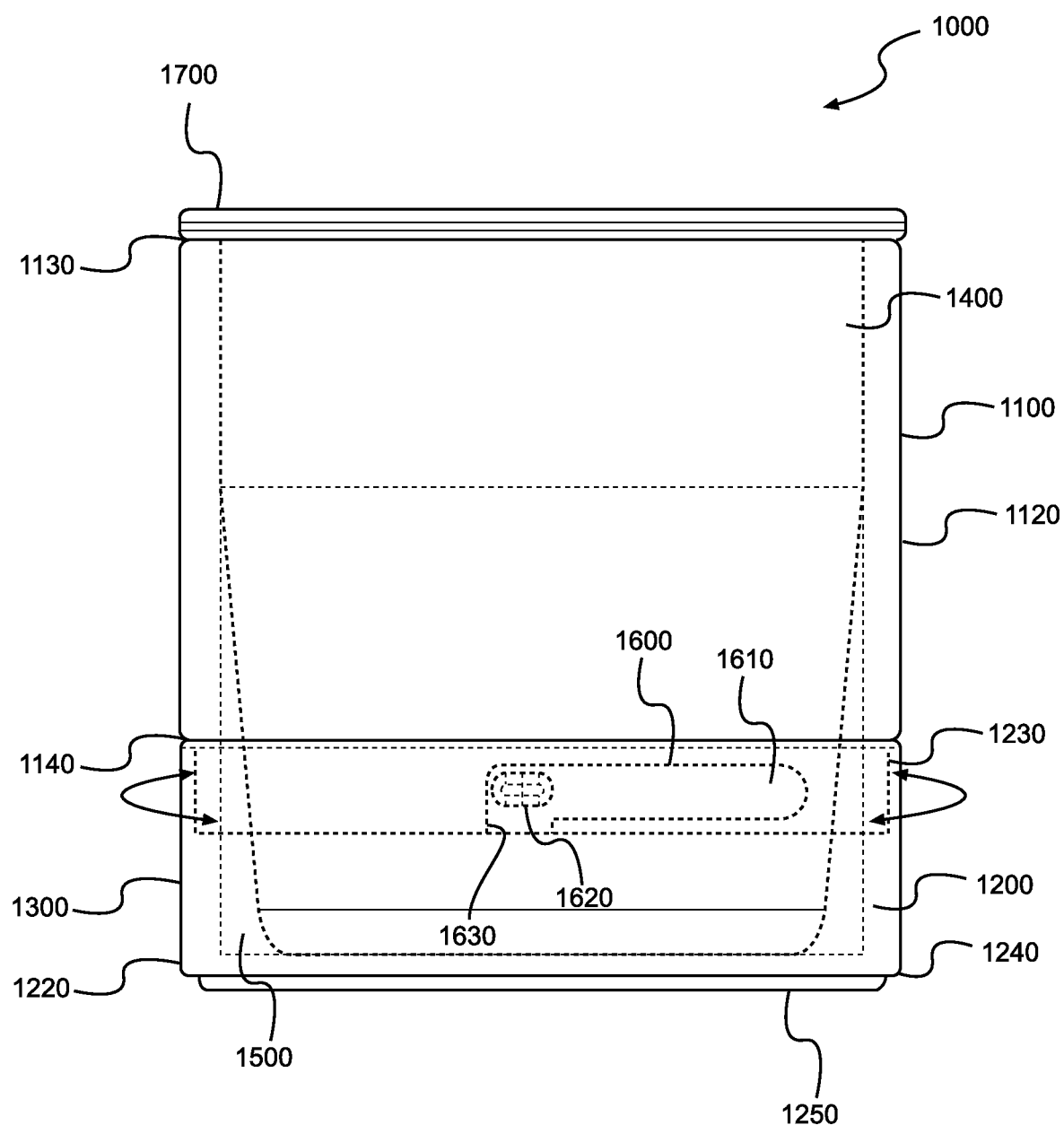
FIG. 2 shows a transparent side view of an embodiment of the reusable candle system.
Figure 3:
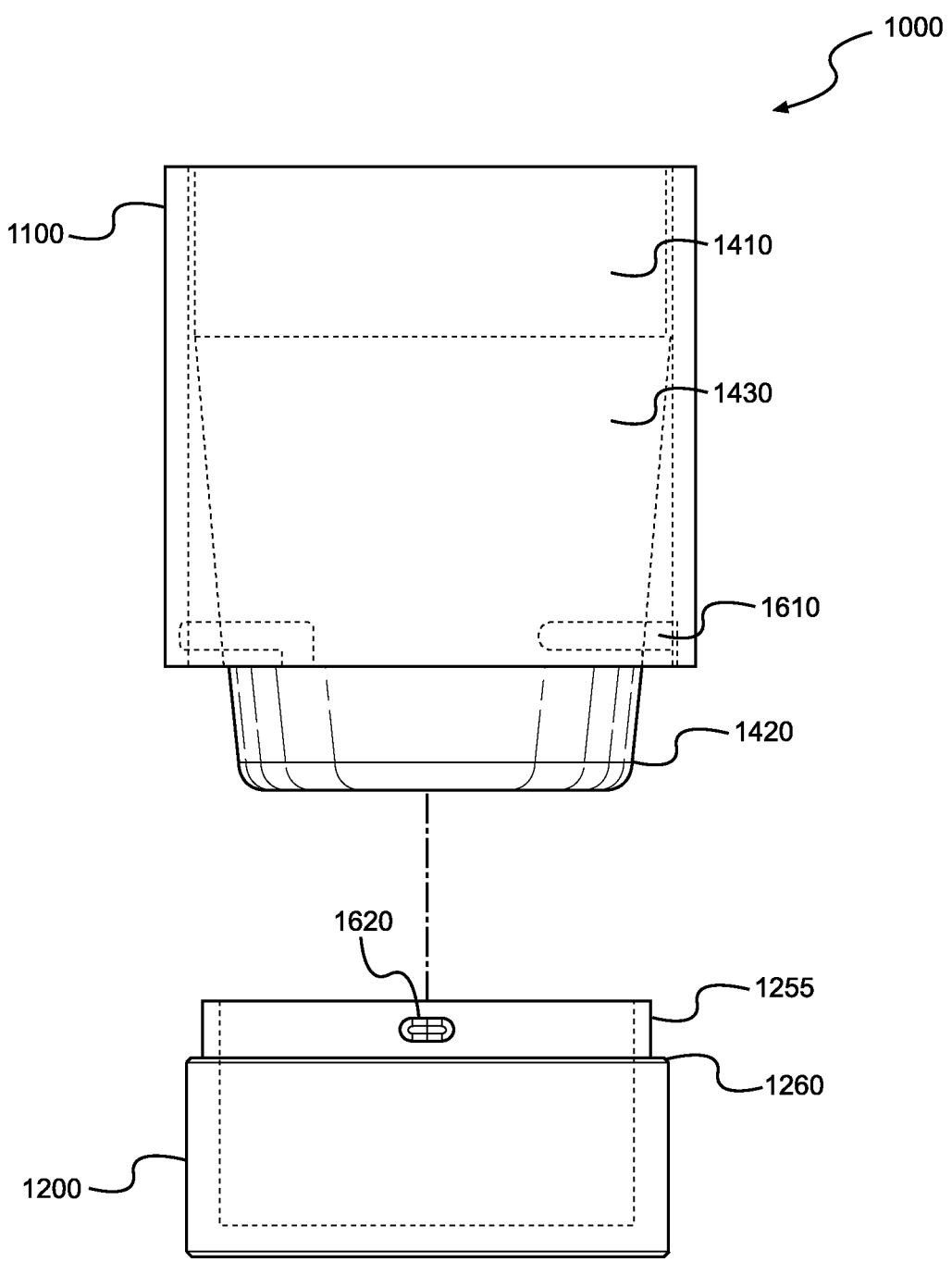
FIG. 3 shows an exploded view of an embodiment of the reusable candle system.

Referring now to FIGS. 1-3, there is shown a perspective view, a transparent side view, and an exploded view of an embodiment of the reusable candle system, respectively. In the illustrated embodiment, the reusable candle system 1000 comprises a first body 1100 removably coupled to a second body 1200 forming a housing 1300, wherein the first and second body 1100, 1200 are disposed in a stacked configuration when coupled to each other. The stacked configuration allows the housing 1300 to form a jar-like appearance forming a single depth. The housing 1300 is adapted to receive a candle insert 1310 therein. In the illustrated embodiment, the housing 1300 comprises a cylindrical shape, however, in alternate embodiments, the housing forms any suitable shape configured to receive a candle insert therein. In the illustrated embodiment, the housing 1300 is composed of metal, such as aluminum. However, in alternate embodiments, the housing is composed of any suitable heat resistant material such as plastic, glass, ceramic, steel, stone, and the like. In the illustrated embodiment, a flexible and reusable sheath 1400 is secured to the first body 1100 and configured to line an interior of the sidewalls 1120, 1220 of the first and second bodies 1100, 1200. The sheath 1400 is configured to receive the candle insert 1310 therein and prevent any wax from adhering directly to the sidewalls of the housing.

Figure 6:
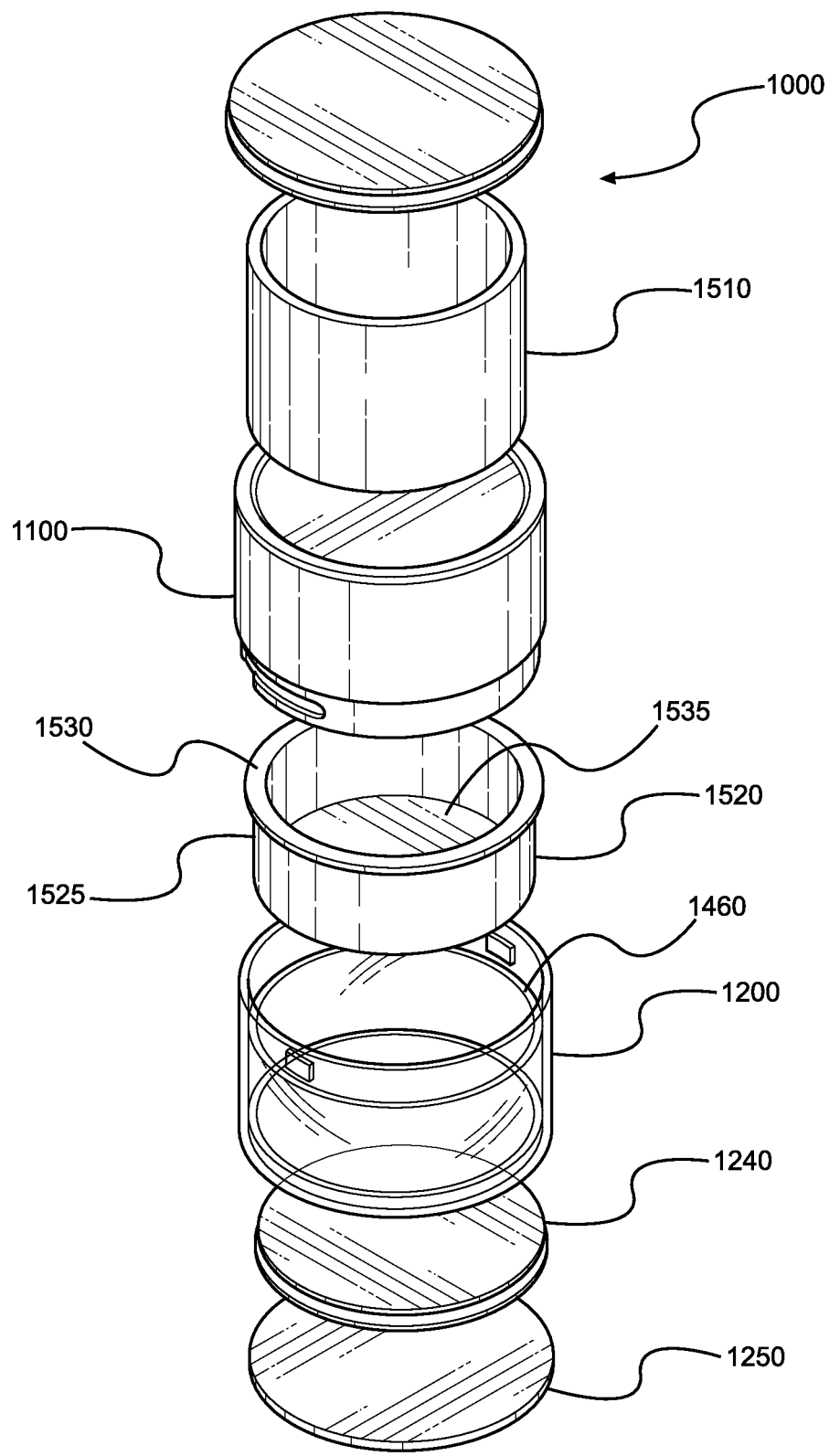
FIG. 6 shows an exploded view of an alternate embodiment of the reusable candle system.
Figure 7:
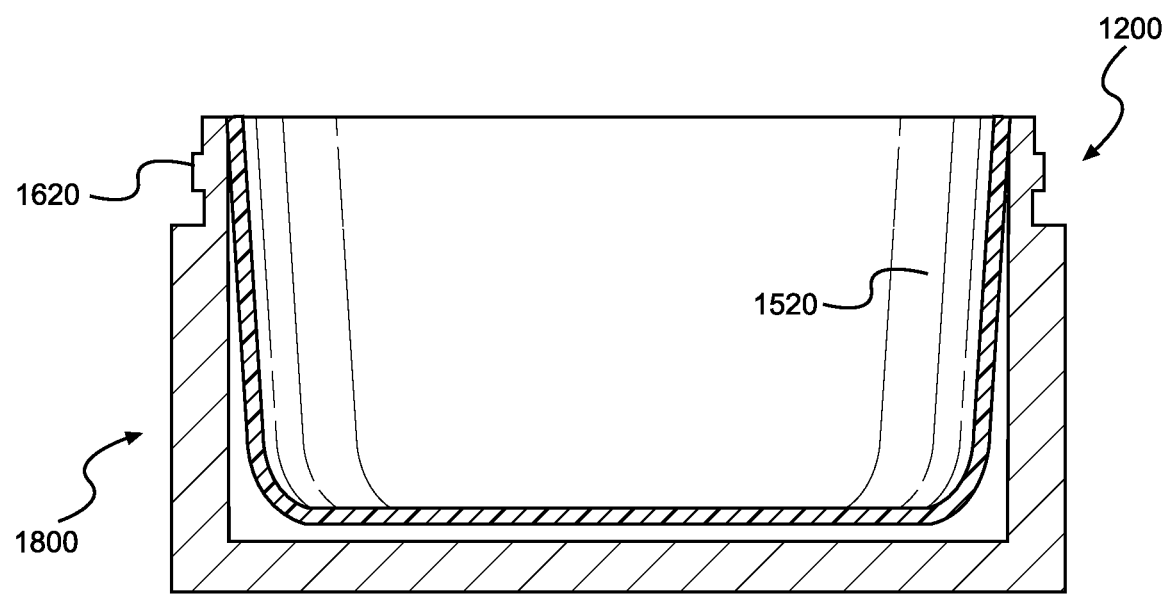
FIG. 7 shows a cross sectional view of the second body of another alternate embodiment of the reusable candle system.
Figure 8:
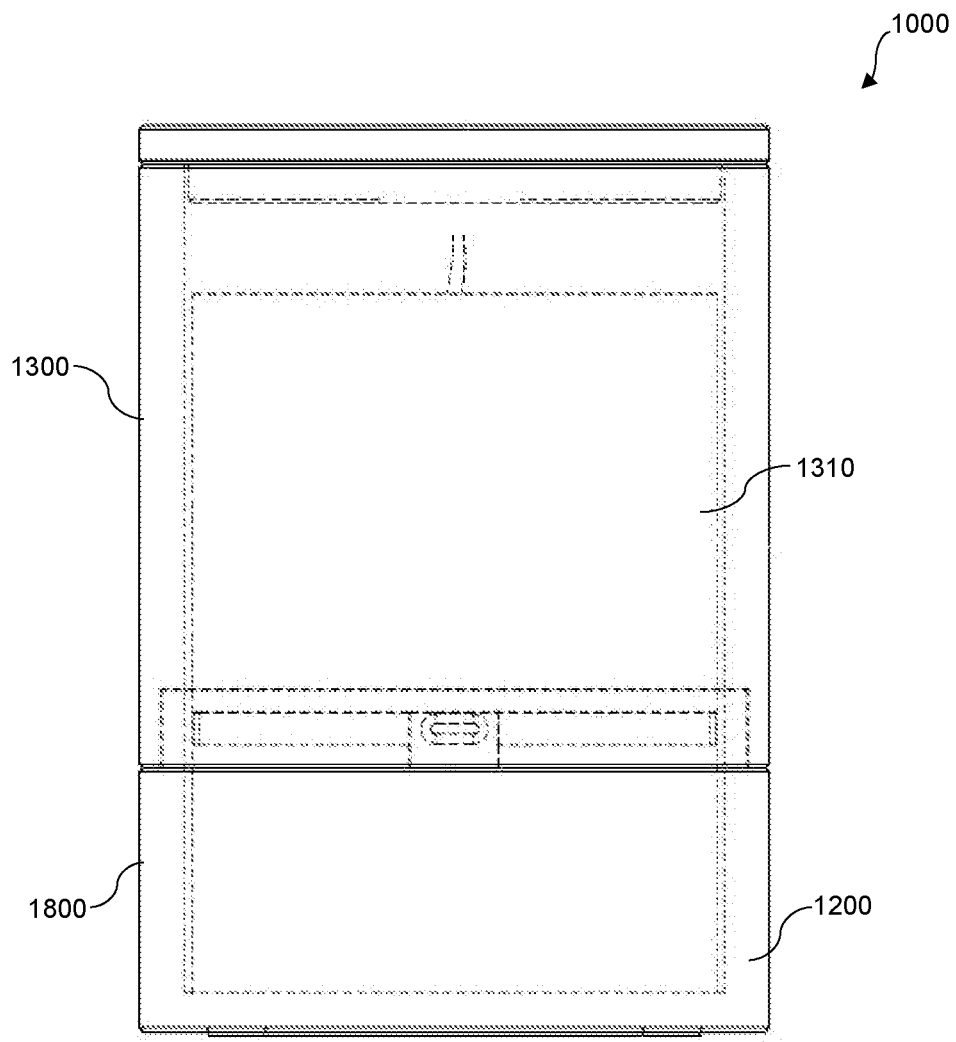
FIG. 8 shows a transparent view of another alternate embodiment of the reusable candle system.

In the illustrated embodiment, the first body 1100 comprises a first sidewall 1120 disposed between an open first 1130 end and an open second end 1140 forming a channel. The second body 1200 comprises a second sidewall 1220 between an open first end 1230 and a closed second end 1240, wherein the second end 1240 forms a base that supports the reusable candle system 1000 in an upright position. The first and second sidewalls 1120, 1220 comprise a same diameter or perimeter distance and are coextensive with one another to form a level sidewall when secured together. In the illustrated embodiment, the interior of each sidewall 1120, 1220 comprises a continuous vertical wall. In the illustrated embodiment, the first body 1100 comprises a larger length than the second body 1200, wherein the length is measured between the ends 1130, 1240 of the housing 1300. The purpose of the larger length within the first body 1100 is to allow for a larger candle insert to be received and burned prior to have to remove the second body 1200 for removal of any wax waste or, in alternate embodiments, using the second body as a smaller second candle holder (as shown in FIGS. 6-8). In some embodiments, the first body 1100 comprises a length at least two times larger than the length of the second body 1200.

In some embodiments, the base comprises a guard 1250 disposed on an exterior thereof to protect any surface on which the candle system 1000 is placed. The guard 1250 protects the surface by absorbing heat from a burning candle, preventing the heat transfer to the surface, as well as providing a scratch resistant material to prevent the surface from becoming scratched if the housing 1300 is slid across the surface. The guard 1250 comprises any suitable material such as silicone or rubber. In the illustrated embodiment, the guard 1250 is a ring shape extending about a perimeter of the base. In other embodiments, the guard comprises a disc shape configured to cover the majority of the surface area of the base. In alternate embodiments, the guard comprises any suitable configuration such as a plurality of shapes disposed on the base adapted to prevent the base from directly contacting the surface on which it is adapted to rest upon.

The open second end 1140 of the first body 1100 is adapted to secure with the open first end 1230 of the second body 1200. The separation of the housing 1300 allows the reusable candle system 1000 to be disassembled to increase the ease in which residual wax or wax waste can be removed once the candle insert 1310 is burned to a low level. In the illustrated embodiment, the first body 1100 and the second body 1200 comprise an interlocking fastener 1600 having a pair of female components 1610 and pair male components 1620 that assemble to connect the first body to the second body. The pair of female interlocking components 1610 can also be seen in FIG. 3. Only one male interlocking component is 1620 shown for clarity in the figures, but an identical male interlocking component is disposed on the opposite side of the second body 1200. The pair of female interlocking components 1610 are disposed on opposite sides at the lower end 1140 on the interior of the sidewall and not visible from the exterior of the candle system 1000 when the housing 1300 is formed. Each female interlocking component 1610 is L-shaped comprising a vertical entrance 1630 at the perimeter of the lower end 1140 and then proceeds in a horizontal direction at a 90-degree angle.

The pair of male interlocking components 1620 are disposed on an exterior of a rim 1255 of the second body 1200. The pair of male components 1620 are identical and are located opposite of each other. In the illustrated embodiment, each male component 1620 comprises an oval cross-sectional shape. However, in alternate embodiments, the male component comprises any suitable cross-sectional shape, such as a square, rectangle or circle. The symmetry of the first and second bodies 1100, 1200 allow for either of the identical male components 1620 to align with either one of the two female components 1610. The vertical openings 1630 of the female components 1610 are configured to receive the male components 1620 therein. Once the male connector is at the upper end of the vertical opening, the first body 1100 is configured to rotate such that the male connector 1620 move into the horizontal space of the female interlocking component 1610 and securely attach the first body 1100 to the second body 1200 to prevent movement.

The rim 1255 comprises a smaller diameter than the diameter of the sidewall 1220 forming a shoulder 1260. The shoulder 1260 is intended to provide a bottom surface to allow the first body 1100 to sit and facilitate the interlocking. When the housing 1300 is formed, the rim 1255 is entirely disposed within the interior volume of the first body 1100. In the illustrated embodiment, the shoulder 1260 is disposed approximately 5 centimeters from the top of the second body 1200. In the illustrated embodiment, the interlocking fastener 1600 requires the user completing an intentional twisting and lifting movement to separate the second body 1200 from the first body 1100. However, in alternate embodiments, other fastening mechanism are contemplated, such as a magnetic faster and alternate male and female interlocking parts, i.e. a tongue and groove.

Figure 9:
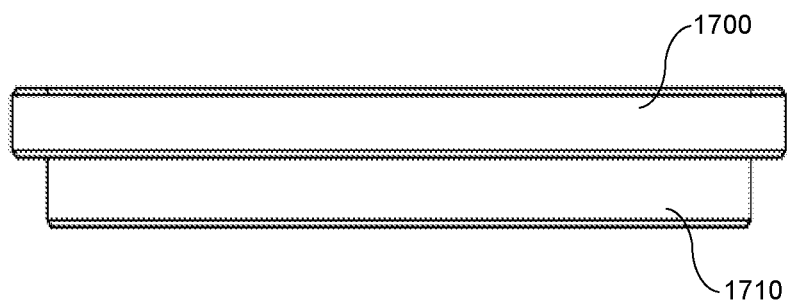
FIG. 9 shows a side view of the lid of an embodiment of the reusable candle system.

In the illustrated embodiment, the reusable candle system 1000 comprises a lid 1700 adapted to removably cover the open upper end 1130 of the housing 1300. The lid 1700 includes a flat top having a substantially same diameter as both the first and second bodies 1100, 1200 and designed to rest atop the upper perimeter of the housing 1300. The lid 1700 comprises a flange 1710 (as seen in FIG. 9) extending concentrically from the top of the lid and is configured to provide a friction fit with the upper end of the housing by passing therethrough and having a substantially same diameter thereof. The lid is composed of any suitable material including plastic, glass, ceramic, metal, steel and stone and other materials within the scope of this intended invention. The lid is intended to be used when the candle is not lit and removed and set aside when the candle insert is lit. Some embodiments do not comprise a lid.

Figure 4:
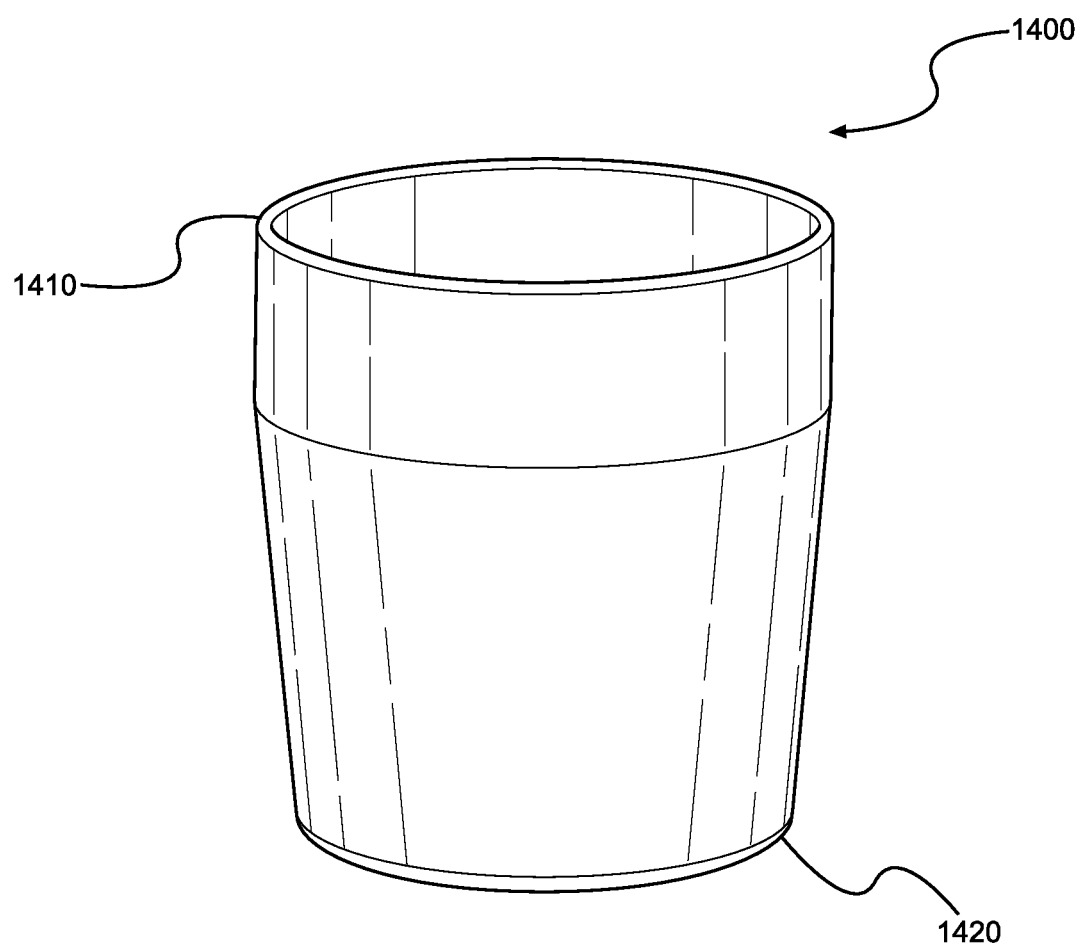
FIG. 4 shows a side view of a sheath of an embodiment of the reusable candle system.

Referring now to FIGS. 3 and 4, there is shown an exploded view of an embodiment of the reusable candle system and a side view of a sheath of an embodiment of the reusable candle system, respectively. In the illustrated embodiment, the sheath 1400 comprises a sidewall 1430 having an open first end 1410 proximate to the first end of the first body and a closed second end 1420 proximate to the closed second end of the second body 1200 when the housing is formed. In the illustrated embodiment, the lower end of the sheath 1400 is rounded. The open upper end 1410 is configured to receive and expose a candle insert disposed within the housing 1300. The sheath 1400 is configured to line the interior of the housing 1300 to prevent wax from adhering directly to the first and second bodies 1100, 1200. In this way, the candle system 1000 can be reused and refilled without wax waste from a first candle insert remaining within the housing when a second candle insert is received therein.

In the illustrated embodiment, the sheath 1400 tapers towards the second body 1200, such that the lower end of the sheath comprises a smaller width than the upper end thereof. In some embodiments, the sheath begins tapering at approximately ¼ inch from an upper end thereof. In other embodiments, the taper begins at any suitable area along the sheath. In the illustrated embodiment, the taper forms a gap 1500 (as seen in FIG. 2) between an interior of the sidewall 1220 of the second body 1200 and the sheath 1400 of approximately 0.5 centimeters to 2 centimeters. The tapered shape of the sheath 1400 allows the candle insert to be easily removed from the housing as needed because the lower end of the candle insert comprises a smaller width or diameter compared to the upper end of the housing. As the candle insert is burned and becomes smaller, the remaining candle insert can easily fit and be pushed through the open upper end of the housing. However, in alternate embodiments, the sheath is not tapered and comprises a uniform width.

In the illustrated embodiment, the sheath 1400 is entirely contained within the housing and, therefore, cannot be exposed to sharp objects when the housing is formed and the candle system is in use, meaning the candle insert is lit within the housing. In the illustrated embodiment, the sheath 1400 is composed of silicone. However, in alternate embodiments, the sheath is composed of any suitable material configured to release wax therefrom, such as rubber.

The sheath 1400 is configured to receive a wax candle insert having a substantially same shape of the interior volume of the sheath 1400. In some embodiments, the reusable candle system 1000 comprises at least one candle insert interchangeable with a second candle insert. The candle inserts are each configured to comprise any desirable color, scent, and shape configured to be received by the sheath. In some embodiments, the candle insert comprises one or more wicks extending from a center of the wax of the candle insert.

In some embodiments, the sheath rests within the housing and is removable therefrom, whereas in other embodiments, the sheath is permanently secured to the housing. In the illustrated embodiment, the upper end of the sheath 1400 is permanently secured to the upper end 1130 of the first body 1100 via any suitable fastener, such as adhesive. The upper one-third to one-half is secured directly to an interior of the sidewall 1120 of the first body 1100. In other embodiments, the sheath 1400 is secured within the housing 1300 via a lip or flange that extends from the open upper end of the first body towards the interior volume thereof. The lip extends around the upper end of the sheath and prevents the upper end of the sheath from passing through the open upper end of the first body. In the illustrated embodiment, the lower end of the sheath 1400 is not adhered to the second body 1200.

In operation, the second body 1200 is separated from the first body 1100 via the interlocking mechanism to expose the bottom of the sheath 1400. Once exposed, the bottom of the sheath 1400 is inverted or pushed upwards within the first body 1100, towards the open upper end 1130 thereof to release any remaining wax waste. The waste wax is configured to be removed through the open upper end of the sheath 1400. In the illustrated embodiment, the bottom of the sheath 1400 is only accessible when the second body 1200 is separated from the first body 1100. Therefore, the bottom of the sheath 1400 can only be selectively exposed to the exterior of the housing when the user separates the bodies from each other.

Figure 5:
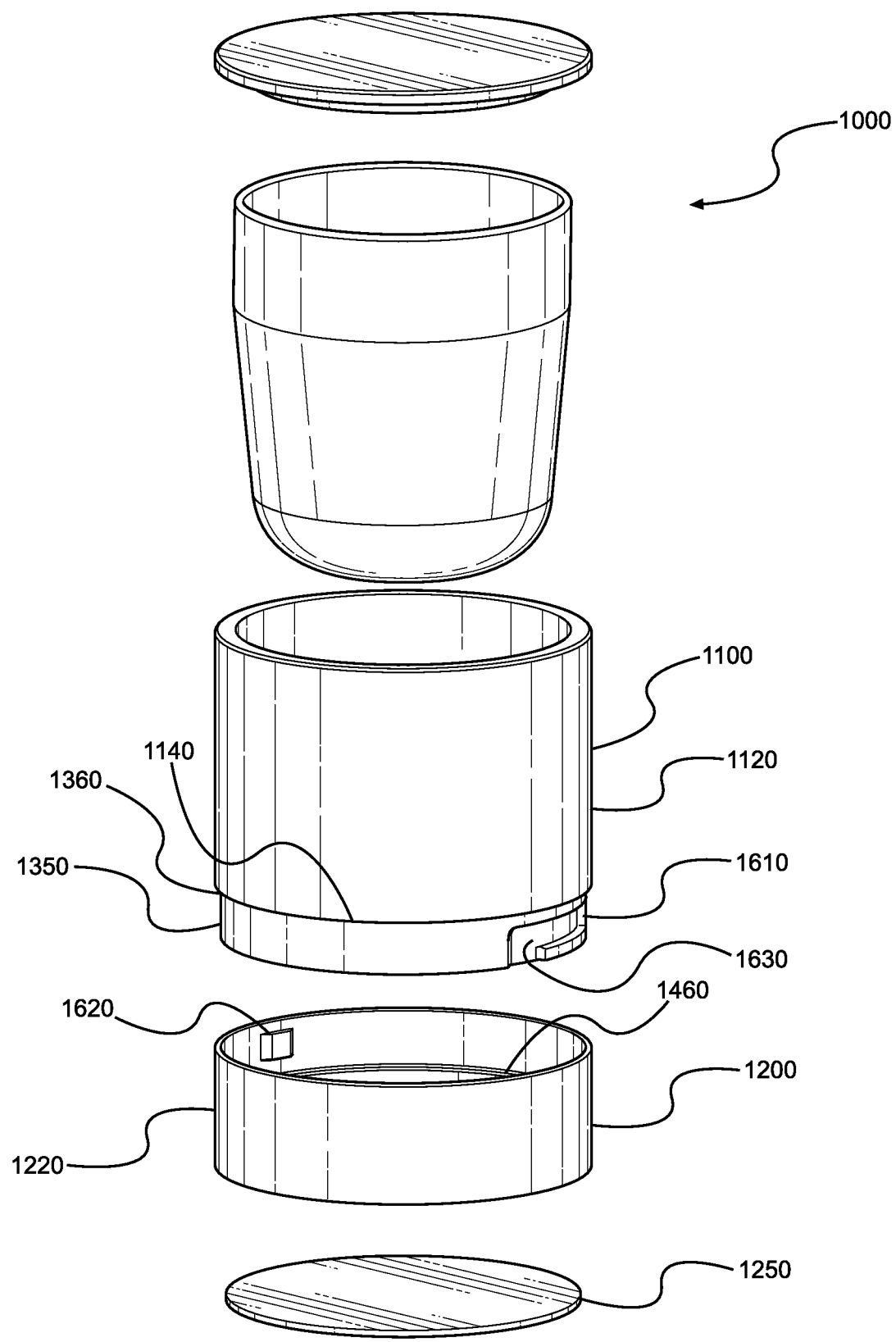
FIG. 5 shows an exploded view of an embodiment of the reusable candle system.

Referring now to FIG. 5, there is shown an exploded view of an alternate embodiment of the reusable candle system. In some embodiments, the interlocking fastener comprises a different configuration than the embodiment shown and described in FIGS. 2 and 3. In the illustrated embodiment, the first body 1100 comprises a rim 1350 extending from a lower end thereof, wherein the rim 1350 comprises a smaller diameter or width than a diameter or width of the sidewall 1120 of the first body 1100, forming a shoulder 1360. The shoulder 1360 is intended to provide a surface or ledge to allow the second body 1200 to sit and facilitate the interlocking. When the housing is formed, the rim 1350 is entirely disposed within the interior volume of the second body 1200 (as shown in FIG. 1). In the illustrated embodiment, the shoulder 1360 is disposed approximately 5 centimeters from the bottom of the sidewall 1120 of the first body 1100.

In the illustrated embodiment, a second shoulder 1460 is formed on the interior of the sidewall 1220 of the second body 1200. The second shoulder 1460 provides a ledge to receive the rim 1350 from the first body 1100. This serves to provide additional support to each body when the housing is formed.

In the shown embodiment, the first body 1100 and the second body 1200 comprise an interlocking fastener having a pair of female interlocking components 1610 and pair male interlocking components 1620 that assemble to connect the first body to the second body. The pair of female interlocking components 1610 are disposed on opposite sides at the lower end 1140 on the exterior of the rim 1350, wherein the female interlocking components are not visible from the exterior of the candle system 1000 when the housing is formed. Each female interlocking component 1610 is L-shaped comprising a vertical entrance 1630 at the perimeter of the lower end 1140 and then proceeds in a substantially horizontal direction.

The pair of male interlocking components 1620 are disposed on an exterior of the interior of the sidewall 1220 of the second body 1200, above the second shoulder 1460. The pair of male components 1620 are identical and are located opposite each other. In the illustrated embodiment, each male component 1620 comprises an oval cross-sectional shape. However, in alternate embodiments, the male component comprises any suitable cross-sectional shape, such as a square, rectangle or circle. The symmetry of the first and second bodies 1100, 1200 allow for either of the identical male components 1620 to align with either one of the two female components 1610. The vertical openings 1630 of the female components 1610 are configured to receive the male components 1620 therein. Once the male connector is at the upper end of the vertical opening, the first body 1100 is configured to rotate such that the male connector 1620 move into the horizontal space of the female interlocking component 1610 and securely attach the first body 1100 to the second body 1200 to prevent movement.

In the illustrated embodiment, the interlocking fastener requires the user completing an intentional twisting and lifting movement to separate the second body 1200 from the first body 1100. However, in alternate embodiments, other fastening mechanism are contemplated, such as a magnetic faster and alternate male and female interlocking parts, i.e. a tongue and groove. In other embodiments, alternate shaped interlocking components are contemplated to prevent separation of the housing.

Referring now to FIGS. 6 and 7, there is shown an exploded view of an alternate embodiment of the reusable candle system and a cross sectional view of the second body of an alternate embodiment of the reusable candle system, respectively. In some embodiments, such as the illustrated embodiment, the sheath comprises a first section 1510 permanently secured to the first body 1100 and a second section 1520 permanently secured to the second body 1200, such that separating the first and second bodies simultaneously separates the first and second sections 1510, 1520 of the sheath. In this way, the second body 1200 serves as a second candle holder 1800 when the first body 1100 is removed therefrom. This allows the candle insert to be used as a full-sized candle when the candle insert is melted to a level lower than the upper end of the second body. In the illustrated embodiment, when the bodies 1100, 1200 are coupled to each other, a first candle holder is formed. When the bodies are uncoupled, the second body 1200 forms the second candle holder 1800.

In FIG. 6, the interlocking mechanism is the same interlocking mechanism as shown and described in FIG. 5. The second section 1520 of the sheath comprises a sidewall 1525, a base 1535, and a lip 1530 extending from the upper end of the sidewall that rests on the second shoulder 1460 of the second body 1200. The second section 1520 rests within the interior of the second body 1200. In some embodiments, the second section 1520 of the sheath is removable from the second body, whereas in alternate embodiments the second section is permanently secured to the second body. The first section 1510 comprises a sleeve having an open upper and lower end. In some embodiments, the first section 1510 is permanently secured to the interior sidewall of the first body.

In FIG. 7, the interlocking mechanism is the same as shown and described in FIGS. 2 and 3. The second section 1520 of the sheath is adapted to rest within the second body 1200. In some embodiments, the second section 1520 tapers towards the lower end of the second body 1200, wherein alternate embodiments the second section comprises a uniform width or diameter that corresponds to a uniform width or diameter of the first section.

In some embodiments, the second body 1200 is transparent, wherein alternate embodiments the second body is non-transparent. In other embodiments, the first body is transparent. In some embodiments, the second end 1240 of the second body 1200 is removably secured to allow easier removal or manipulation of the second section 1520 of the sheath.

Referring now to FIG. 8, there is shown a transparent view of another embodiment of the reusable candle system. In some embodiments, the reusable candle system does not include the sheath and the housing 1300 directly receives the candle insert 1310 therein. In this way, similarly to the embodiment shown in FIG. 7, when the bodies 1100, 1200 are coupled to each other, a first candle holder is formed. When the bodies are uncoupled, the second body 1200 forms the second candle holder 1800, wherein the candle insert is solely housing therein. In some embodiments, an additional second body is provided such that while the original second body is being used as the second candle holder, the user has the option to start the process again by placing a new candle insert into the additional and identical second body and interlocking the first body therewith.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A reusable candle system, comprising:
   a first body removably coupled to a second body forming a housing, wherein the first and second body are disposed in a stacked configuration when coupled;
   wherein the first body comprises a sidewall disposed between an open first end and an open second end;

wherein the second body comprises a sidewall between an open first end and a closed second end, wherein the second end forms a base that supports the reusable candle system in an upright position;

a flexible sheath secured to the first body and configured to line an interior of the sidewall of the first and second body, wherein the sheath comprises an open first end proximate to the first end of the first body and a closed second end proximate to the closed second end of the second body;

wherein the sheath is secured at an upper end thereof to an upper region of the sidewall of the first body and tapers inwardly toward a lower region of the sidewall of the first body, wherein a portion of the sheath is spaced apart from the sidewall of the first body, forming a gap between the sheath and the sidewall of the first body;

wherein the sheath forms an interior volume adapted to receive a candle therein.

2. The reusable candle system of claim 1, wherein the gap is maintained between the sheath and the second body when the first body and second body are coupled together.

3. The reusable candle system of claim 1, further comprising an interlocking fastener having a female and a male interlocking component that assemble to connect the first body to the second body.

4. The reusable candle system of claim 3, wherein the female component is disposed on an exterior of a rim extending from a lower end of the first body and comprises an L-shaped recess having a vertical opening along the open second end of the first body.

5. The reusable candle system of claim 4, wherein the vertical opening turns at a 90-degree angle and continues in a horizontal direction and then stops to form the female interlocking component.

6. The reusable candle system of claim 4, wherein the rim is disposed within an interior volume of the second body when the housing is formed.

7. The reusable candle system of claim 3, wherein the male interlocking component comprises a protrusion disposed on an interior of the sidewall the second body.

8. The reusable candle system of claim 6, wherein a second shoulder is formed on an interior of the sidewall of the second body and the protrusion is disposed above the second shoulder.

9. The reusable candle system of claim 6, wherein the rim comprises a diameter smaller than a diameter of the sidewall of the first body, forming a shoulder configured to receive the first end of the second body thereon when the housing is formed.

10. The reusable candle system of claim 1, wherein the sidewalls of the first and second body are coextensive with one another to form a level sidewall when secured together.

11. The reusable candle system of claim 1, wherein the sheath is removed from the second body when the first body is separated therefrom.

12. The reusable candle system of claim 11, wherein the sheath is configured to invert such that a bottom of the sheath can be forced within an interior volume of the sheath.

13. The reusable candle system of claim 1, wherein the sheath comprises a first section secured to the first body and a second section secured to the second body, such that separating the first and second bodies simultaneously separates the first and second sections of the sheath.

14. The reusable candle system of claim 13, wherein the second body serves as a candle support when the first body is removed therefrom.

15. The reusable candle system of claim 1, further comprising a guard disposed on an exterior side of the second end of the second body, wherein the guard forms a protective layer to prevent heat from the candle from damaging a support surface.

16. The reusable candle system of claim 1, wherein the sheath comprises a lip to prevent the sheath from moving past a perimeter of the first end of the second body.

17. The reusable candle system of claim 1, wherein the candle is pre-formed prior to being received within the first body.

18. The reusable candle system of claim 1, wherein the open first end and the open second end of the first body comprise substantially a same outside diameter.

19. The reusable candle system of claim 1, wherein the sheath comprises an entirely planar bottom.

20. The reusable candle system of claim 1, wherein the gap between the sheath and the sidewall of the first body has a width between 0.5 centimeters and 2 centimeters.

* * * * *